US010520043B2

(12) United States Patent
Hornbrook et al.

(10) Patent No.: US 10,520,043 B2
(45) Date of Patent: Dec. 31, 2019

(54) DUAL CLUTCH ASSEMBLY WITH NEUTRAL FUNCTION AND TRANSMISSION ASSEMBLY

(71) Applicant: EATON CORPORATION, Cleveland, OH (US)

(72) Inventors: Michael J Hornbrook, Orland, IN (US); Jason A. Brady, Commerce Township, MI (US)

(73) Assignee: Eaton Intelligent Power Limited, Dublin (IE)

( * ) Notice: Subject to any disclaimer, the term of this patent is extended or adjusted under 35 U.S.C. 154(b) by 64 days.

(21) Appl. No.: 15/563,225

(22) PCT Filed: May 18, 2017

(86) PCT No.: PCT/US2017/033345
§ 371 (c)(1),
(2) Date: Sep. 29, 2017

(87) PCT Pub. No.: WO2017/201925
PCT Pub. Date: Nov. 23, 2017

(65) Prior Publication Data
US 2018/0187727 A1 Jul. 5, 2018

Related U.S. Application Data

(60) Provisional application No. 62/338,241, filed on May 18, 2016, provisional application No. 62/344,769, (Continued)

(51) Int. Cl.
*F16D 21/06* (2006.01)
*F16D 27/12* (2006.01)
(Continued)

(52) U.S. Cl.
CPC .............. *F16D 21/06* (2013.01); *F02B 33/38* (2013.01); *F02B 39/12* (2013.01); *F16D 27/112* (2013.01);
(Continued)

(58) Field of Classification Search
CPC ............ F16D 2021/0646; F16D 21/06; F16D 27/112; F16D 27/12; F16H 3/006; F02B 33/38; F02B 39/12; Y10T 74/19228
See application file for complete search history.

(56) References Cited

U.S. PATENT DOCUMENTS 5,711,409 A * 1/1998 Murata ................. F16D 48/062
192/48.611
6,327,935 B1 * 12/2001 Joslin ..................... B60K 17/02
74/650

(Continued)

FOREIGN PATENT DOCUMENTS

CN 101448665 A 6/2009
CN 102216639 A 10/2011
(Continued)

OTHER PUBLICATIONS

Written Opinion and International Search Report for PCT/US2017/033345 dated Aug. 10, 2017, pp. 1-9.

*Primary Examiner* — Patrick Cicchino
(74) *Attorney, Agent, or Firm* — Mei & Mark LLP

(57) ABSTRACT

A dual clutch assembly comprises a rotatable second input shaft that surrounds and is concentric with a rotatable first input shaft. A rotatable hub surrounds the first input shaft. A first and a second clutch rotor are connected to the rotatable hub. The first clutch rotor comprises a pulley coupling and a clutch surface. The second clutch rotor comprises a clutch surface. A stationary electromagnetic assembly is mounted between the first clutch rotor and the second clutch rotor. A first armature assembly is coupled to the first input shaft and (Continued)

is configured to couple to the first clutch surface of the first clutch rotor in response to a first electromagnetic signal. A second armature assembly is coupled to the second input shaft and is configured to couple to the clutch surface of the second clutch rotor in response to a second electromagnetic signal.

15 Claims, 11 Drawing Sheets

Related U.S. Application Data filed on Jun. 2, 2016, provisional application No. 62/356,833, filed on Jun. 30, 2016, provisional application No. 62/480,124, filed on Mar. 31, 2017.

(51) Int. Cl.
*F02B 33/38* (2006.01)
*F02B 39/12* (2006.01)
*F16D 27/112* (2006.01)
*F16H 3/00* (2006.01)
*F02B 39/04* (2006.01)

(52) U.S. Cl.
CPC ............. *F16D 27/12* (2013.01); *F16H 3/006* (2013.01); *F16D 2021/0646* (2013.01); *F16H 2200/0034* (2013.01)

(56) References Cited

U.S. PATENT DOCUMENTS

| | | | |
|---|---|---|---|
| 7,513,349 | B2 | 4/2009 | Houle et al. |
| 7,900,760 | B2 | 3/2011 | Houle et al. |
| 8,167,752 | B2 | 5/2012 | Houle |
| 8,387,767 | B2 | 3/2013 | Komorowski et al. |
| 8,441,161 | B2 * | 5/2013 | Makino .................. B60K 1/00 310/76 |
| 8,485,331 | B2 | 7/2013 | Parsons et al. |
| 8,776,767 | B2 | 7/2014 | Ouwenga et al. |
| 8,851,258 | B2 | 10/2014 | Komorowski et al. |
| 2007/0119678 | A1 | 5/2007 | Houle et al. |
| 2008/0053417 | A1 | 3/2008 | Eybergen et al. |
| 2009/0200129 | A1 | 8/2009 | Houle et al. |
| 2009/0221390 | A1 | 9/2009 | Houle |
| 2010/0122882 | A1 | 5/2010 | Komorowski et al. |
| 2010/0133059 | A1 * | 6/2010 | Winkler ................ F16D 27/112 192/84.21 |
| 2010/0230227 | A1 | 9/2010 | Parsons et al. |
| 2011/0175475 | A1 | 7/2011 | Makino et al. |
| 2011/0253077 | A1 * | 10/2011 | Boffelli .................. F01P 5/04 123/41.44 |

FOREIGN PATENT DOCUMENTS

| | | |
|---|---|---|
| CN | 102257290 A | 11/2011 |
| EP | 2333374 A1 | 6/2011 |
| JP | 2010106907 | 5/2010 |
| WO | 2015054017 | 4/2015 |

* cited by examiner

DUAL CLUTCH ASSEMBLY WITH NEUTRAL FUNCTION AND TRANSMISSION ASSEMBLY

This is a § 371 National Stage Entry of Application No. PCT/US2017/033345, filed May 18, 2017 and claims the benefit of U.S. provisional application No. 62/480,124 filed Mar. 31, 2017, U.S. provisional application No. 62/356,833 filed Jun. 30, 2016, U.S. provisional application No. 62/344,769 filed Jun. 2, 2016, and U.S. provisional application No. 62/338,241 filed May 18, 2016, all of which are incorporated herein by reference.

FIELD

This application provides a two-speed electromagnetic clutch with a neutral function and gear parings for transmitting torque.

BACKGROUND

Superchargers such as Roots blowers or twin screw devices can be lossy because the engine crankshaft is always connected by a pulley to the input shaft of the supercharger. Even when the supercharger is idle, the pulley set-up draws torque from the engine crankshaft. Additional losses occur when the supercharger lobes continue rotating when boosting is not required, and the boosted air must be bypassed around the engine.

Further, it is desirable to have different drive speeds of the supercharger, but the complexity and footprint required to do so is prohibitive.

SUMMARY

The methods and devices disclosed herein overcome the above disadvantages and improves the art by way of a two speed, dual-clutch assembly, which comprises a rotatable first input shaft comprising a first portion and a second portion. A rotatable second input shaft surrounds the first portion of the first input shaft, and the second input shaft is concentric with the first input shaft. A rotatable hub surrounds the second portion of the first input shaft. A first clutch rotor is connected to the rotatable hub, and the first clutch rotor comprises a pulley coupling and a clutch surface. A second clutch rotor is connected to the rotatable hub, and the second clutch rotor comprises a clutch surface. A stationary electromagnetic assembly is mounted between the first clutch rotor and the second clutch rotor. The electromagnetic assembly is configured to emit at least a first electromagnetic signal and a second electromagnetic signal. A first armature assembly is coupled to the first input shaft. The first armature assembly is configured to couple to the first clutch surface of the first clutch rotor when the electromagnetic assembly emits the first electromagnetic signal. A second armature assembly is coupled to the second input shaft. The second armature assembly is configured to couple to the clutch surface of the second clutch rotor when the electromagnetic assembly emits the second electromagnetic signal.

A gear set, or transmission assembly, can be joined to the dual-clutch assembly to form a two speed, dual-clutch transmission. The gear set can comprise a rotatable first input shaft and a first gear comprising a first gear ratio coupled to the first input shaft. A rotatable second input shaft can surround a portion of the first input shaft. The second input shaft can be concentric with the first input shaft. A second gear can comprise a second gear ratio coupled to the second input shaft. A counter shaft can be parallel to the first input shaft. A first output gear can be connected to the counter shaft, the first output gear coupled to transfer torque from the first gear. A second output gear can be connected to the counter shaft, the second output gear coupled to transfer torque from the second gear. The first gear is in constant mesh with the first output gear. The second output gear is in constant mesh with the second gear.

A supercharger assembly can comprise the above dual-clutch transmission. The supercharger assembly can comprise a supercharger input shaft mechanically coupled to the clutch transmission. The supercharger assembly can be configured to selectively convert between a neutral operation mode, a first drive ratio operation mode, and a second drive ratio operation mode in response to the presence or absence of a first electromagnetic signal and a second electromagnetic signal. The supercharger can comprise a pair of lobed rotors, wherein the pair of lobed rotors are mechanically coupled to the supercharger input shaft, and wherein the neutral operation mode does not transfer torque from the clutch transmission to the pair of lobed rotors.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

Figure 11:
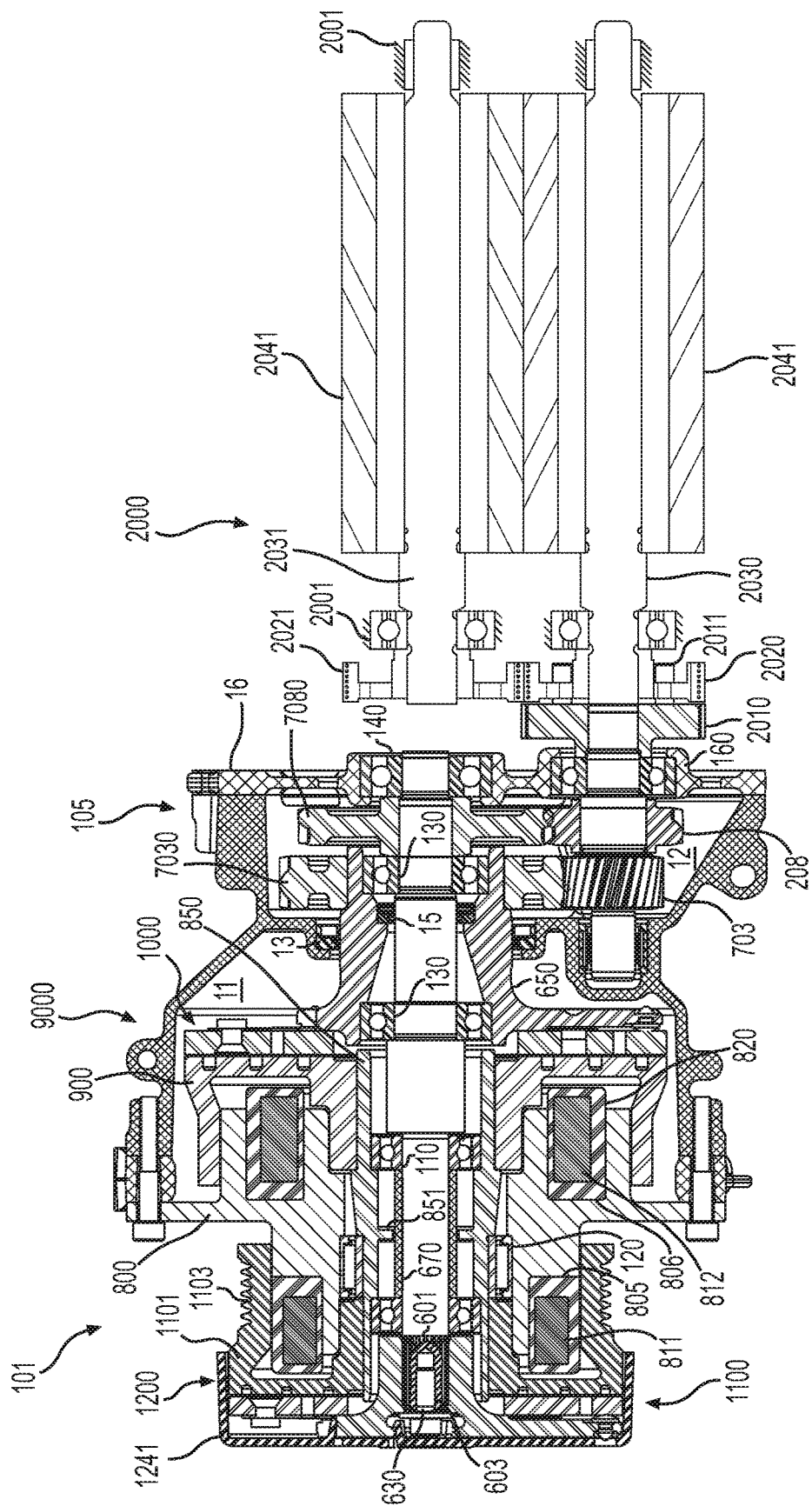
FIG. 11 is a view of a supercharger assembly comprising a dual-clutch transmission.

The disclosure provides a supercharger assembly 2000, shown in FIG. 11, comprising a two speed clutch, wherein the clutch comprises a neutral functionality. Including a neutral functionality limits torque losses. The rotor lobes 2041 can be decoupled from the dual-clutch assembly 101, which permits the lobes to idle. This reduces or eliminates the need for bypassing boosted air. The engine crankshaft remains connected for torque output via a pulley across the pulley coupling 1103 of the dual-clutch transmission. The first and second clutch rotors 1101 & 900 are spun-up with the pulley coupling 1103, which reduces time to torque. A supercharger assembly 2000 can comprise the dual-clutch transmission for controlling the flow rate of the positive displacement pump. The supercharger assembly 2000 can comprise a supercharger input shaft 2030 mechanically coupled to the dual-clutch transmission. For example, a coupler 2010 on the counter shaft 700 of dual-clutch transmission can comprise a coupling mechanism such as pins 2011 for coupling the counter shaft 700 to a supercharger assembly. In a direct-drive set-up, a transfer gear 2020 on the supercharger input shaft 2030 can couple to the pins 2011 on the coupler 2010. The transfer gear 2020 can transfer torque to a receiving gear 2021 directly. Other mechanisms in a transfer case can be substituted. Rotor lobes 2041 are mounted to rotate as the first rotor shaft, which is integrated to form the supercharger input shaft 2030 in this example, and the second rotor shaft 2031 rotate. Bearings can be included in the supercharger assembly housing 2001. The supercharger assembly 2000 can be configured to selectively convert between a neutral operation mode, a first drive ratio operation mode, and a second drive ratio operation mode in response to the presence or absence of a first electromagnetic signal and a second electromagnetic signal in the dual-drive clutch transmission. The supercharger can comprise the pair of rotor lobes 2041, wherein the pair of lobed rotors are mechanically coupled to the supercharger input shaft 2030, and wherein the neutral operation mode does not transfer torque from the dual-clutch transmission to the pair of rotor lobes 2041.

The dual-clutch transmission can be used with other superchargers and other driven devices. Two speeds can be selected for transferring torque via the two clutches in the dual-clutch transmission. For example, when the electromagnetic assembly 8000 emits a first electromagnetic signal, as by applying an electric signal to first coil winding 811, the first armature plate 1221 is made of a material that is attracted in the direction of the first coil winding 811, and first armature assembly 1200 couples the rotatable first input shaft 600 to the first clutch rotor 1101. The first input shaft 600 can be configured to under-run a pulley speed of a pulley connected to the pulley coupling 1103. Choosing the relative diameters of the first gear 7080 and first output gear 708 further impacts the drive ratio of the dual-clutch transmission. By way of example, the first clutch of the dual-clutch transmission can be configured for a "low" setting. Then, the second clutch can be configured for a "high" setting, by appropriately selecting the relative diameters of the second gear 7030 and second output gear 703. And, when the electromagnetic assembly 8000 emits a second electromagnetic signal, as by applying a second electric signal to second coil winding 812, the second armature plate 1011 is made of a material that is attracted in the direction of the second coil winding 812, and second armature assembly 1000 couples the rotatable second input shaft 650 to the second clutch rotor 900, and the second input shaft 650 is configured to over-run the pulley speed of the pulley connected to the pulley coupling 1103.

Figure 5A:
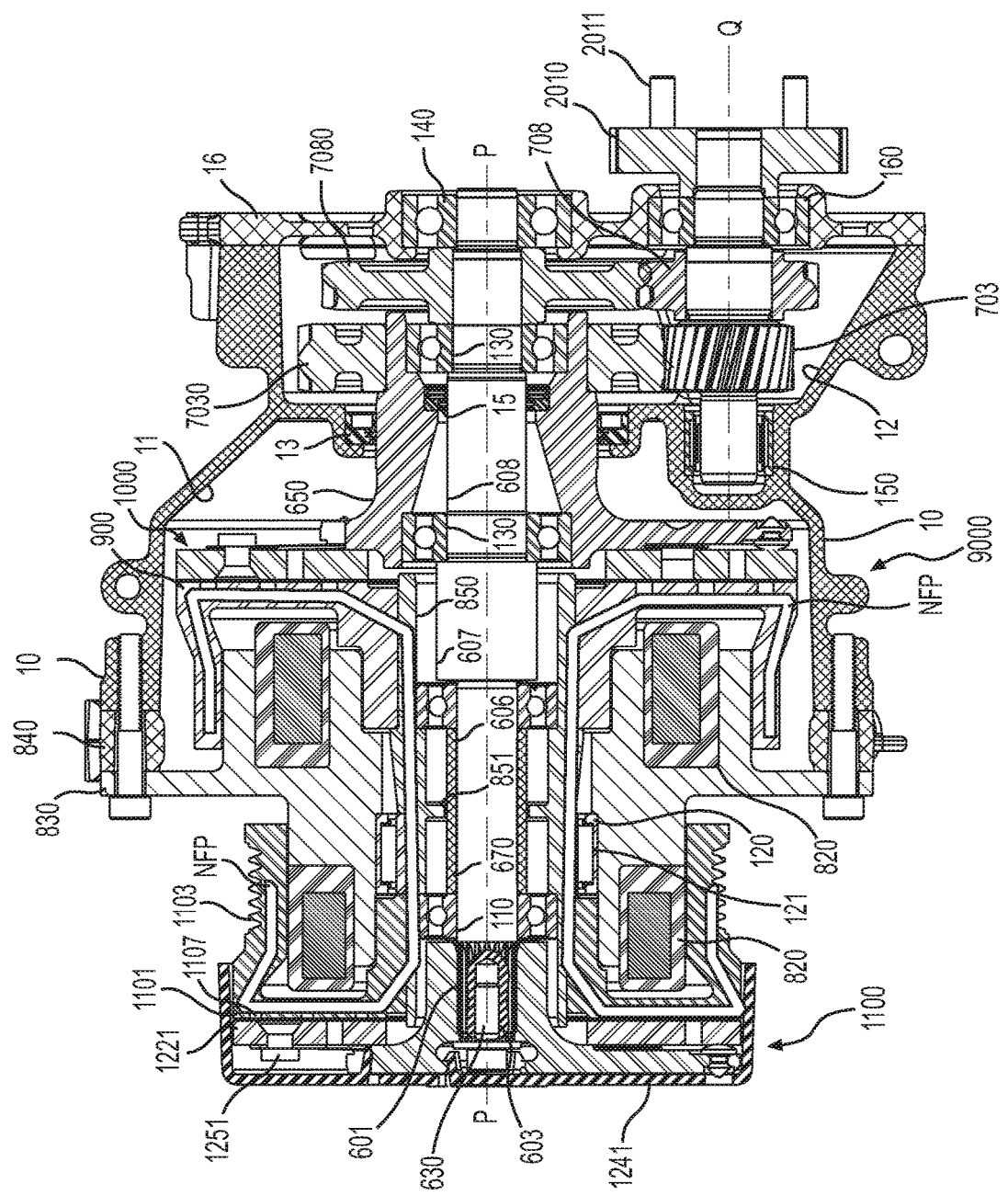
FIGS. 5A-5C are cross-section views of a dual-clutch transmission with torque flow paths overlaid.

The dual-clutch transmission comprises concentric input shafts in the form of first input shaft 600 and second input shaft 650. The concentric input shafts can be configured for direct drive of a related device. Constant mesh gears, such as first gear 7080, second gear 7030, first output gear 708, and second output gear 703, can be mounted to the first input shaft 600 and to the second input shaft 650. Constant mesh here means that the gears are never out of mesh. The gears are not moved or de-coupled from one another to change gears. The constant mesh gears transmit torque, but are not shifted to do so. The constant mesh gears can be coupled to a common output shaft, such as counter shaft 700. Counter shaft 700, in the examples herein, rotates whenever one of the first or second clutch assemblies 1100, 9000 is engaged (FIGS. 5B & 5C), but counter shaft 700 does not rotate when the dual clutches are in a neutral status (FIG. 5A). The dual-clutch transmission 100 is configured to provide direct and independent actuation of the gear sets in the transmission assembly 105. First gear set (comprising first gear 7080 and first output gear 708) can be actuated independently from second gear set (comprising second gear 7030 and second output gear 703).

Figure 1:
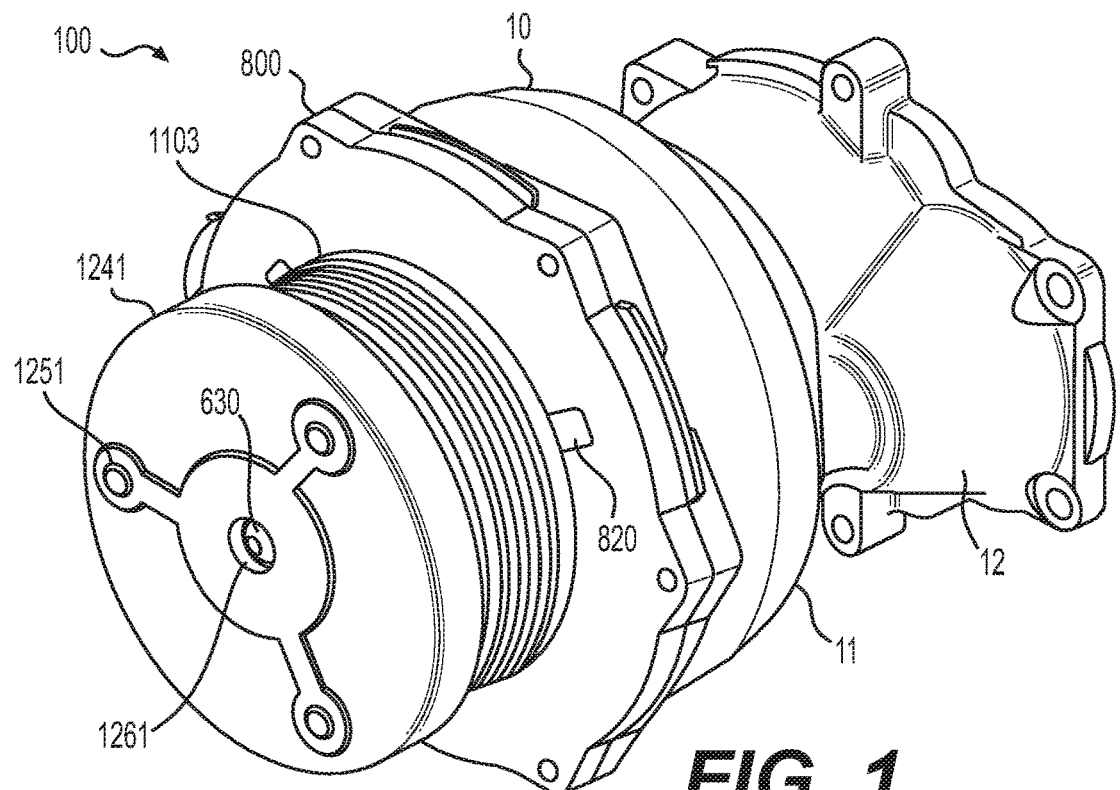
FIG. 1 is a perspective view of a dual-clutch transmission.
Figure 2:
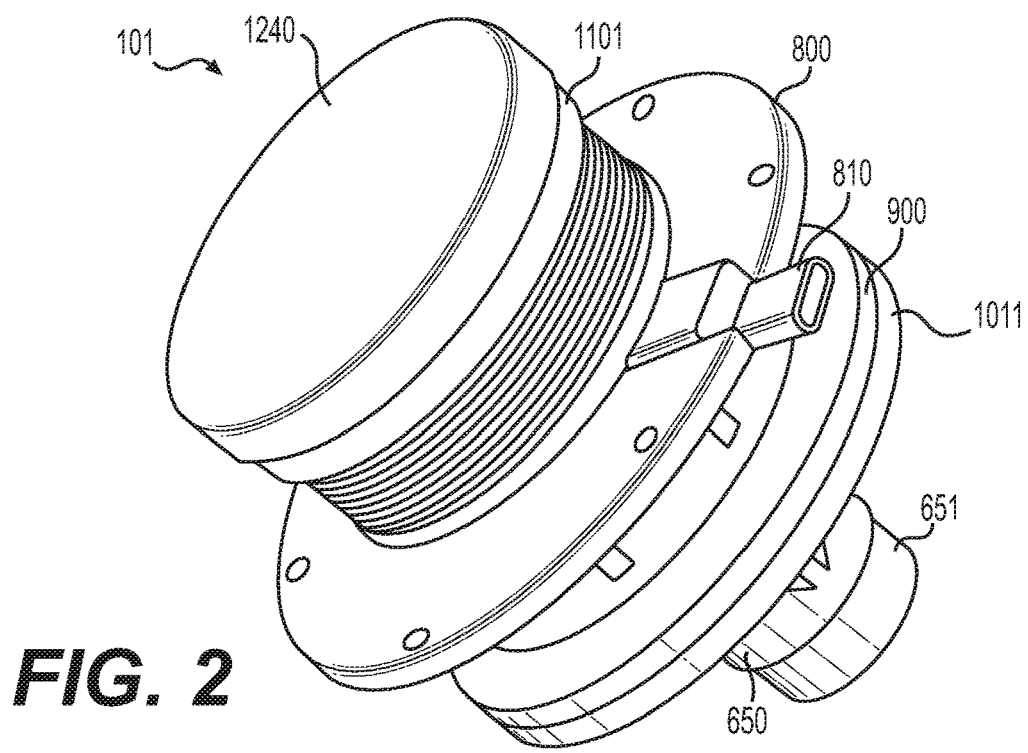
FIG. 2 is perspective view of a dual-clutch assembly.

A two speed, dual-clutch transmission 100 comprises a dual clutch assembly 101 and a transmission assembly 105. Turning to FIG. 1, a first dual clutch assembly is shown comprising a first cap or dust cover 1240 covering a first armature assembly 1200. Dust cover 1241 can be stamped to comprise a shape or can be more uniformly molded, as dust cover 1240 (FIG. 2).

Pulley coupling 1103 of first clutch rotor 1101 can receive a pulley, such as a belt, to transfer torque from the crankshaft of an engine or another torque source such as a motor. Pulley coupling 1103 is exemplary, and other couplings than the illustrated tracks can be used, for example, chain drive, rollers, cones, or other couplings can be substituted. Electromagnetic mounting hub 800 can comprise a mounting rim 830 for coupling to housing 10. Or, an intervening mounting bracket 840 can be included (FIG. 5A). The mounting bracket 840 or mounting rim 830 can further comprise features for mounting such accessories as thermal sensors, control electronics, positioning mechanisms, etc.

One aspect of the dual-clutch transmission design permits the joining of a dry clutch with a wet transmission. And, the driven device can be either wet or dry. In the example herein, the driven device moves a fluid such as air to constitute a dry device. So, housing 10 can comprise a clutch housing portion forming a dry compartment 11. At least some portion of the second clutch assembly 9000 is housed. For example, second armature assembly 1000 can be housed in the dry compartment 11 and thereby provided with a dry environment.

A gear housing portion of the housing 10 can then provide a wet compartment 12 for the transmission assembly 105. The wet compartment 12 can surround a portion of the second input shaft 650 and provide a fluid-tight container for the portion of the second input shaft 650. A seal 13 can adjoin the gear housing portion of the housing and the second input shaft 650. The seal can be, for example, a hydrodynamic lip seal comprising spiral grooves for pumping lubrication back to the wet compartment 12. The gears within the wet compartment 12 can fling oil or other lubricating substance around the wet compartment 12, and the seal 13 can be designed to return the lubricating substance to the gears. A similar seal 15 can be included between first input shaft 600 and second input shaft 650 to likewise return lubricating substance. In this instance, a bearing 130 can be re-lubricated. Other seals than hydrodynamic lip seals can be used for seals 13, 15.

FIG. 2 shows the dual-clutch assembly 101 separate from the housing 10 and transmission assembly 105. Dust cover 1241 covers first armature assembly 1200, but shown are portions of first clutch rotor 1101, electromagnetic mounting hub 800, control plug 810, second clutch rotor 900, second armature plate 1011 of second armature assembly 1000, and gear surface 651 of second input shaft 650.

Figure 3:
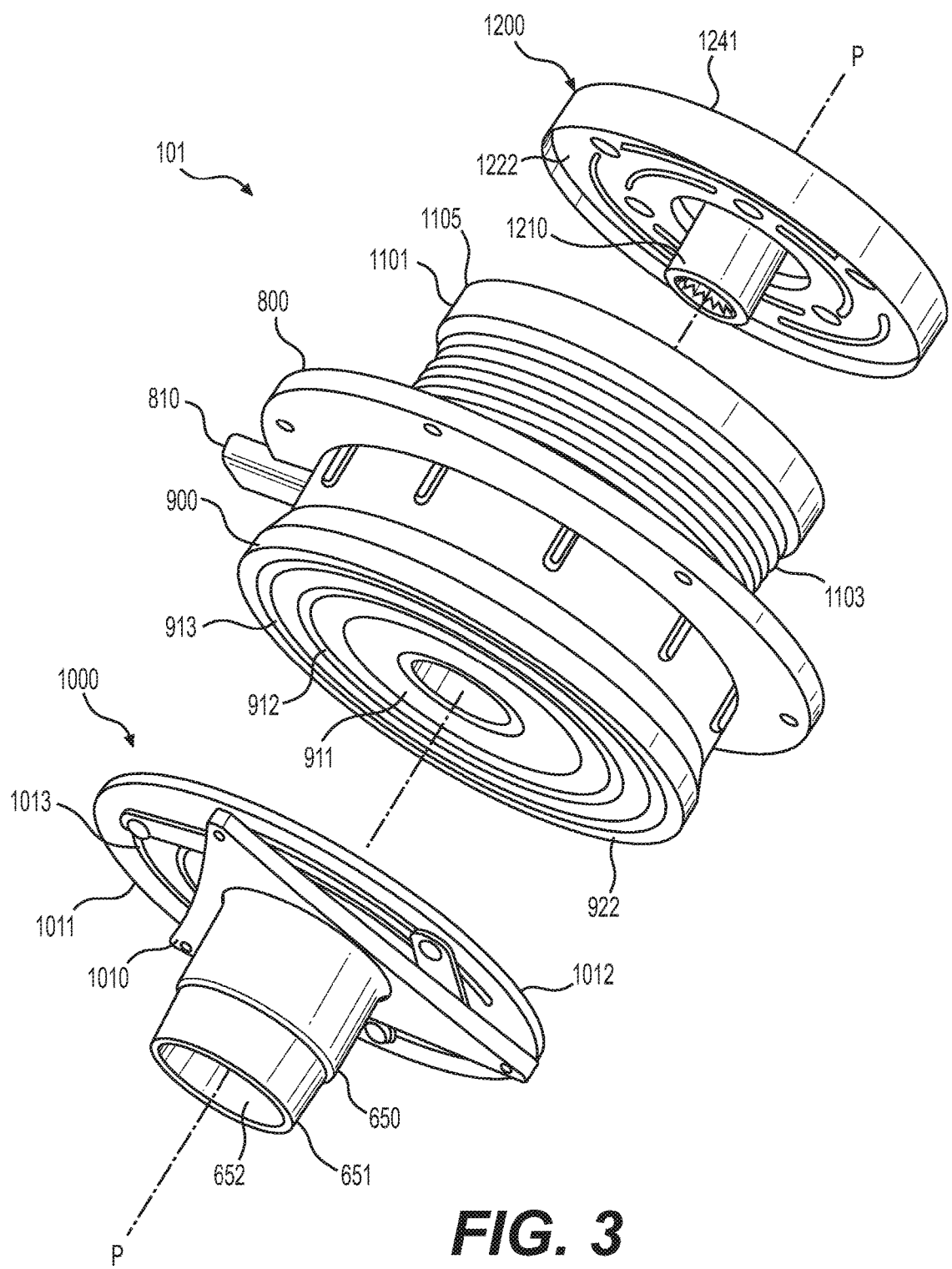
FIG. 3 is an exploded view of a dual-clutch assembly.

The armature assemblies can differ from one another in several respects. In FIG. 3, the coupling surfaces 1012, 1222 of the armature assemblies 1000, 1200 are oriented inwardly, towards respective coupling surfaces 922, 1105 of the clutch rotors. The first armature assembly 1200 is configured as a terminal end of the dual-clutch assembly 101, so the spindle 1210 for torque transfer is designed to couple into the dual-clutch assembly 101, while the second armature assembly 1000 is on an output end of the dual-clutch assembly 101, and so extends a means for coupling torque downstream. The first input shaft 600 is omitted in this Figure, but it extends from spindle 1210, through dual-clutch assembly, and within the second input shaft 650 as a means for coupling torque downstream.

Figure 9:
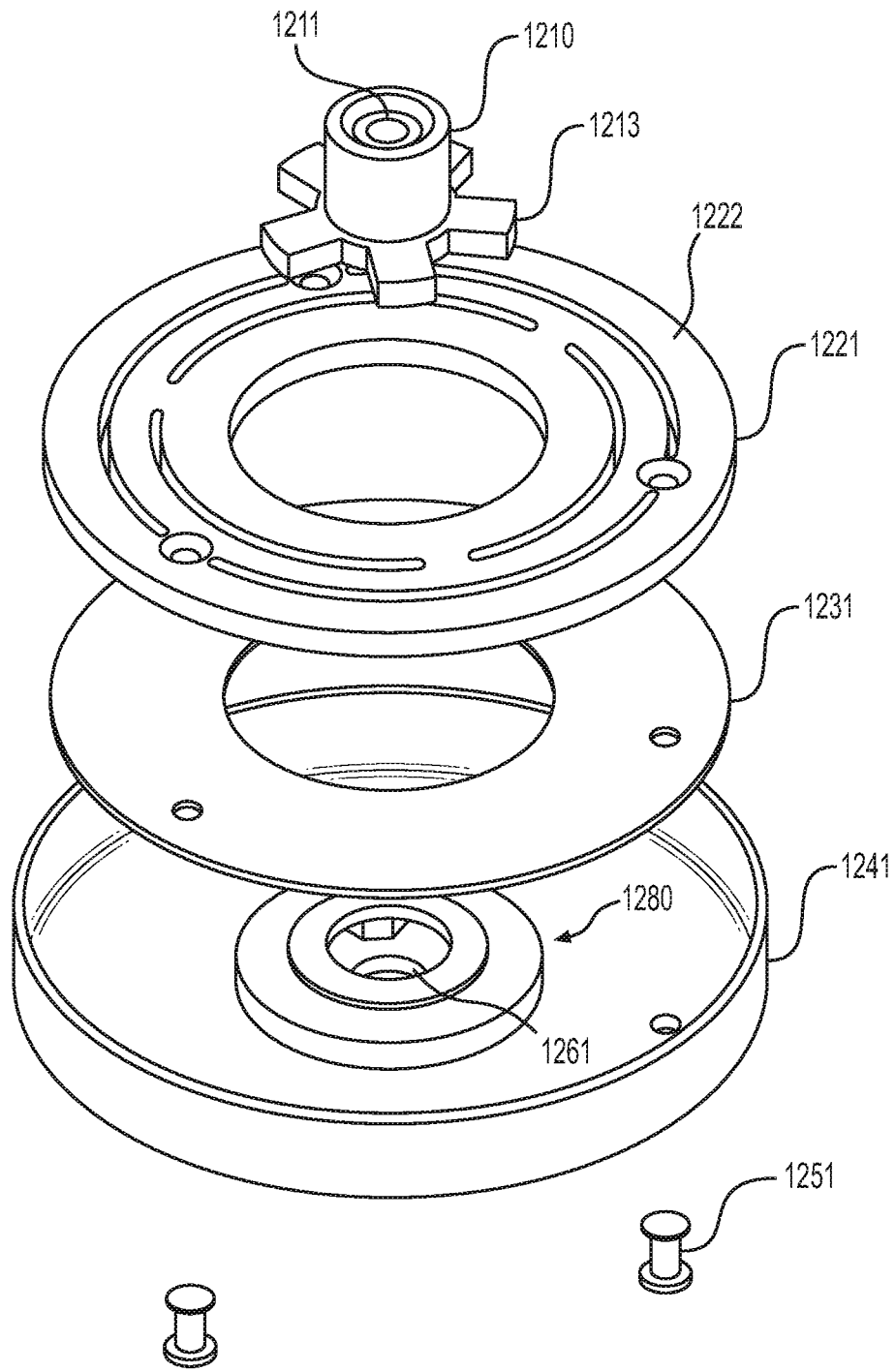
FIG. 9 is a view of a first armature assembly.
Figure 10:
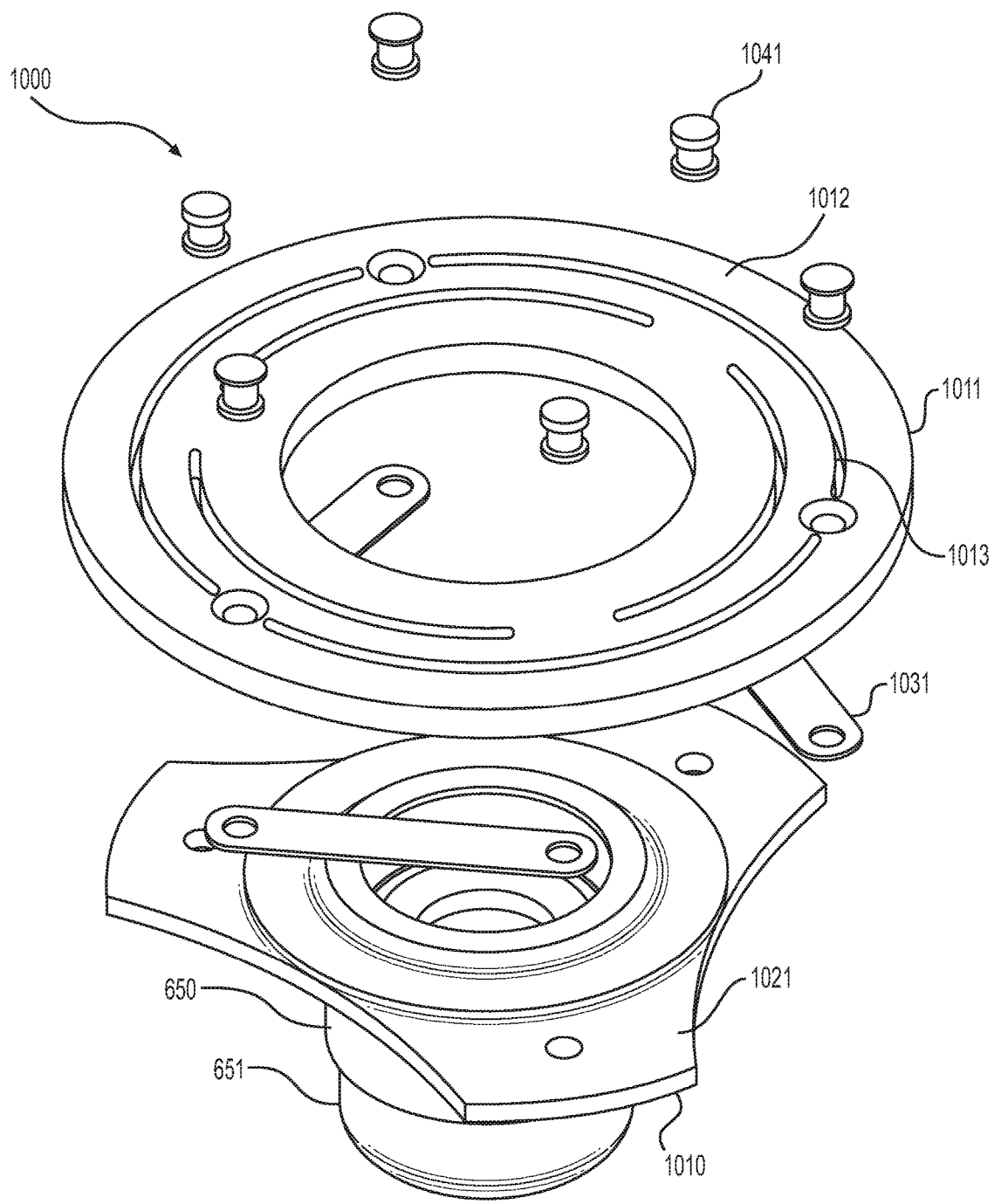
FIG. 10 is a view of a second armature assembly.

With reference to FIGS. 3, 9 & 10, first armature assembly comprises a dust cover 1240 or 1241 coupled via fastener 1251 to a cushion 1231 and to first armature plate 1221. The cushion 1231 can be one or more of a noise dampening material, a flexible material, or elastomeric material. In FIGS. 1 and 9, the dust cover 1241 is stamped to comprise a shape and comprises a coupling hole 1261. Pin 630 can extend through coupling hole 1261, through coupling hole 1211 in spindle 1210 and in to bore 603 of first input shaft 600. This secures dust cover 1241 to the first armature assembly 1100. Alternatively, dust cover 1240 can be snap-fitted.

A spline coupling can be between end spline 601 of first input shaft 600 and inner spline within spindle 1210. A bias assembly 1280 can be included within dust cover 1241. Fingers 1213 press on bias assembly 1280. When a first electromagnetic signal draws first armature plate 1221 towards first clutch rotor 1101, coupling surface 1222 of first armature assembly 1200 couples to coupling surface 1105 of first clutch assembly 1100. Torque can transfer along first flow path FFP (FIG. 5C). When the first electromagnetic signal is terminated, a spring force aids in disconnecting the coupling surfaces 1105, 1222. Thereby, the first armature assembly 1200 disconnects torque transfer through the first clutch assembly 1100. The rotatable hub 850 is disconnected from both the first input shaft 600 and the from the second input shaft 650.

The spring force can be attained by including a flexure aspect in the cushion 1231 so that when the first armature plate 1221 is fastened to the cushion 1231, the cushion can be biased to return to a position that draws the first armature plate 1221 away from the first clutch rotor 1101. Further, cushion 1231 can be fastened to the dust cover 1240 or 1241, and the dust cover can be designed to bias the first armature plate 1221 away from the first clutch rotor 1101. This can be achieved by one or more of shaped stampings illustrated on dust cover 1241 and strategic placement of fasteners 1251. Designing the dust cover to comprise a flexure aspect can provide the requisite spring force. A bias assembly 1280 comprising flexing discs can additionally or alternatively provide spring force.

A further alternative is for first armature assembly 1200 to comprise drive straps 1260 and so operate similarly to second armature assembly 1000. A coupling surface 1012 on second armature plate 1011 faces coupling surface 922 on second clutch rotor 900. Drive straps 1031 connect between the second armature plate 1011 and an armature hub 1010. The armature hub 1010 can comprise a triangular shape (FIG. 3), fingers 1021 (FIG. 10), or another shape, such as that of fingers 1213 (FIG. 9). Armature hub 1010 is coupled to or integrally formed with rotatable second input shaft 650.

Figure 5B:
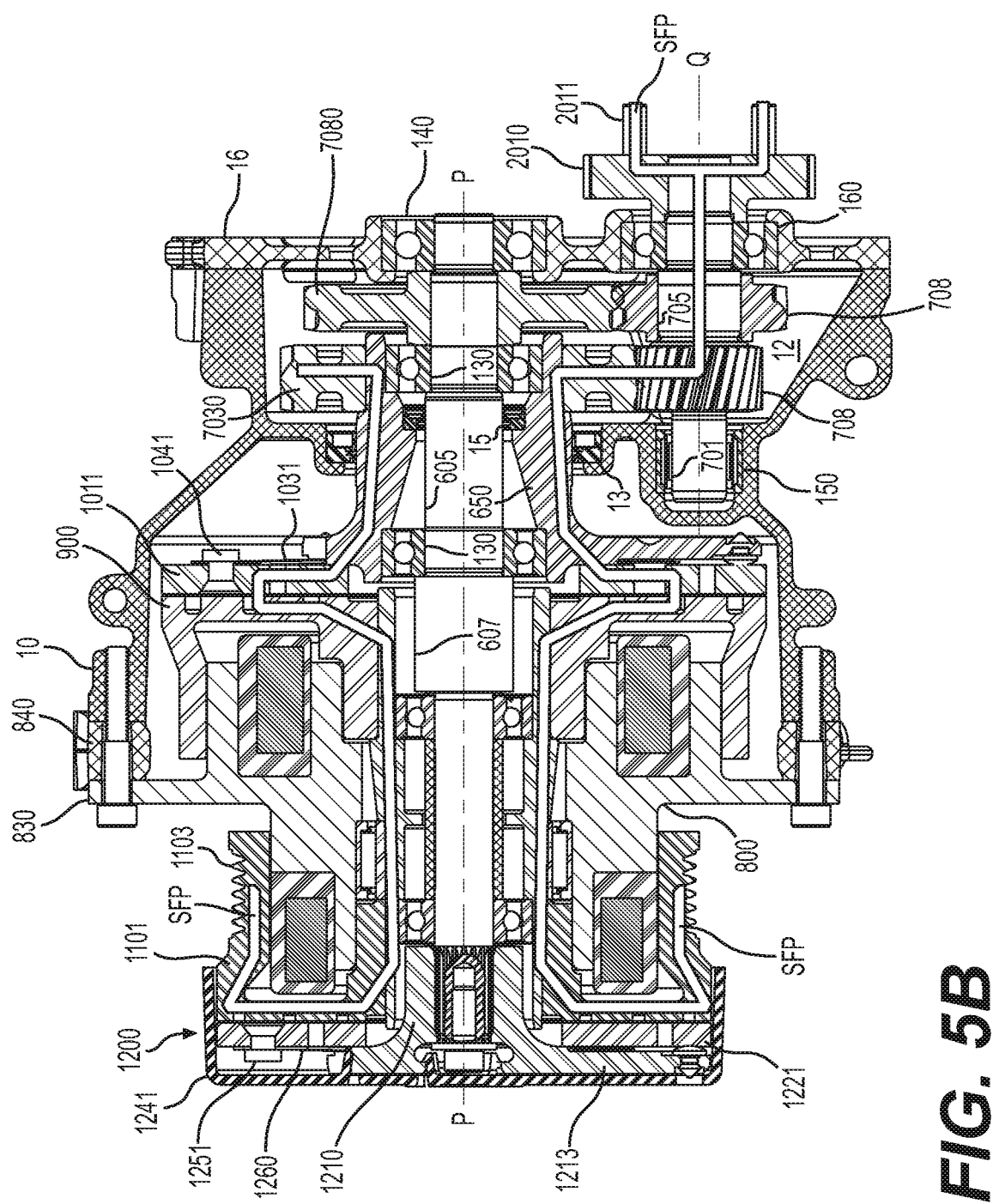
Figure 5C:
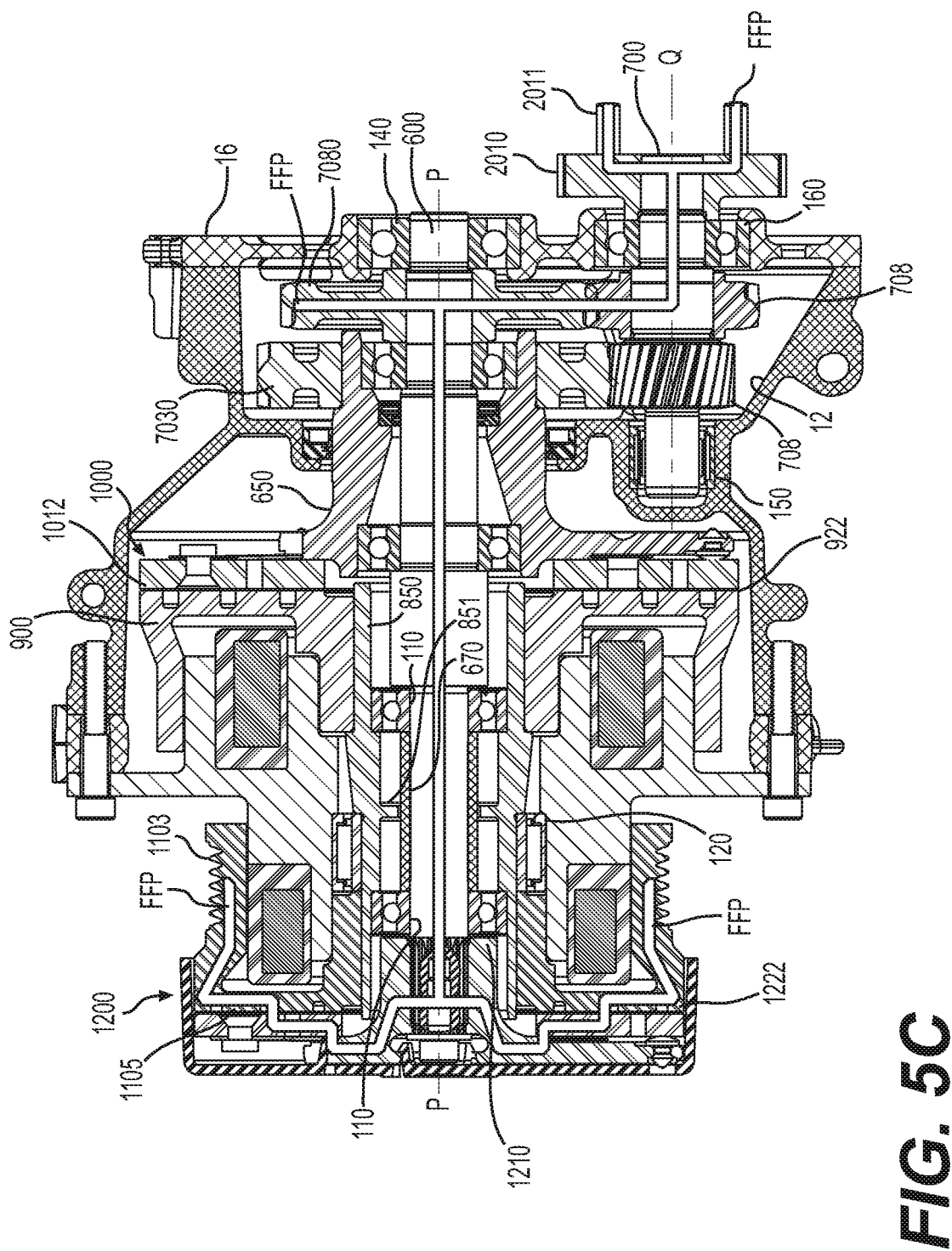

When a second electromagnetic signal is applied, the second armature plate 1011 is drawn towards second clutch rotor 900 and torque can be transferred along second flow path SFP (FIG. 5B). When the second electromagnetic signal is terminated, in order to return the first armature assembly and the second armature assembly to a neutral position, a spring force in drive straps 1031 aids in disconnecting the coupling surfaces 1012, 922. Thereby, the second armature assembly 1000 disconnects torque transfer through the second clutch assembly 9000. The rotatable hub 850 is disconnected from both the rotatable first input shaft 600 and the from the rotatable second input shaft 650 and torque is limited to flow through neutral flow path NFP (FIG. 5A) whereby rotatable hub 850 rotates with the first clutch rotor 1101 and the second clutch rotor 900.

The coupling surfaces can comprise respective grooves, such as grooves 911, 912, 913 formed in coupling surface 922, and grooves 1107 formed in coupling surface 1105, or grooves 1013 formed in second armature plate 1011, etc., for functions such as heat dissipation, wiping, torque transfer control or the like. In some applications, it is beneficial to provide a friction material seated in the grooves.

Figure 4:
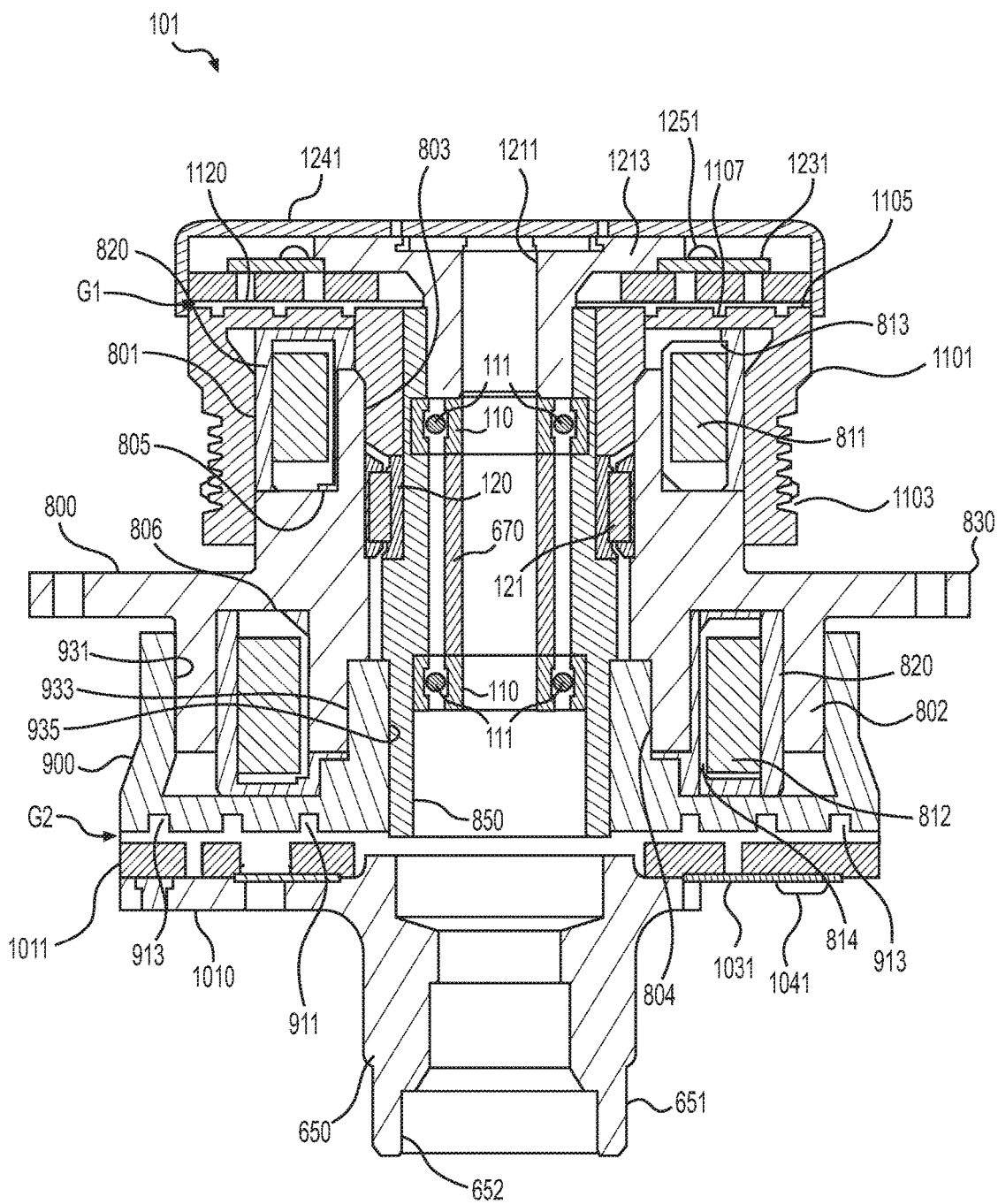
FIG. 4 is a cross-section view of an alternative dual-clutch assembly.

FIG. 4 shows one arrangement of a dual-clutch assembly. The cushion 1231 is shown coupled near fingers 1213 to pull first armature plate 1221 away from first clutch rotor 1101 to form a first gap G1 there between in the neutral condition. A second gap G2 is formed between second clutch rotor 900 and second armature plate 1011 by drive straps 1031 biased between armature hub 1010 and second armature plate 1011.

Figure 6:
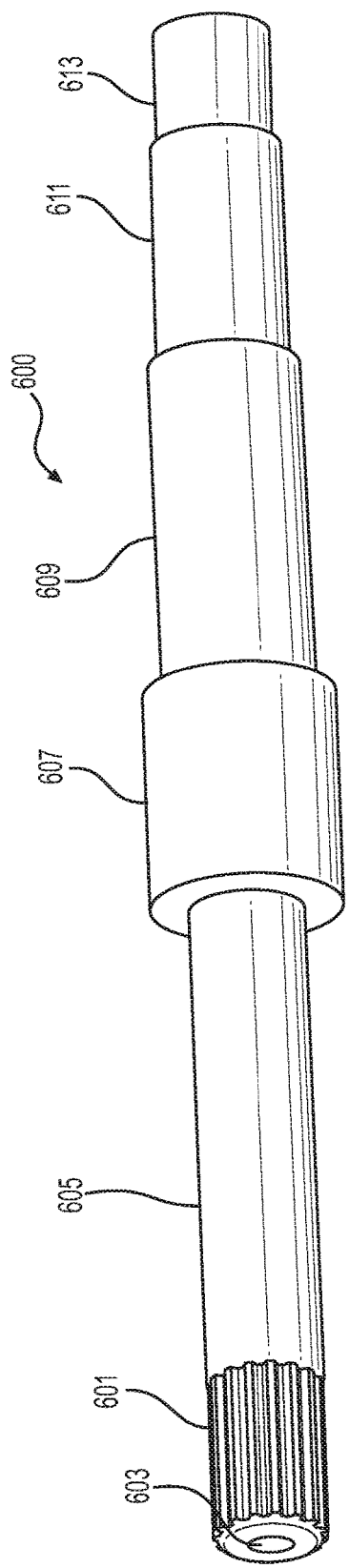
FIG. 6 is a view of a first input shaft.
Figure 7:
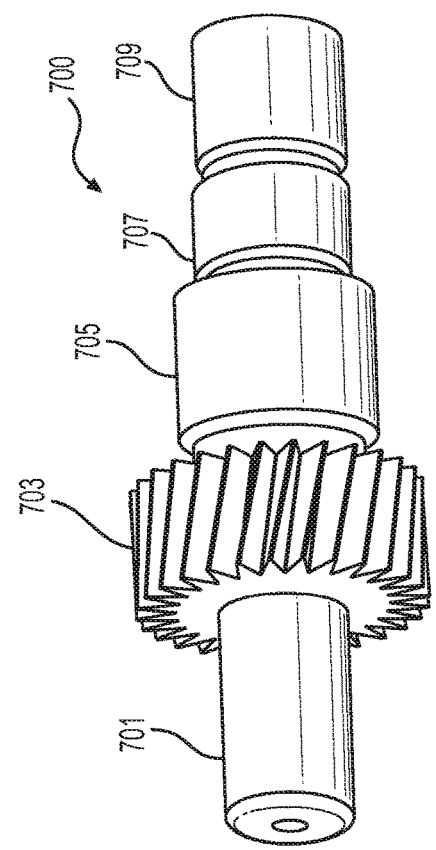
FIG. 7 is a view of a counter shaft.
Figure 8:
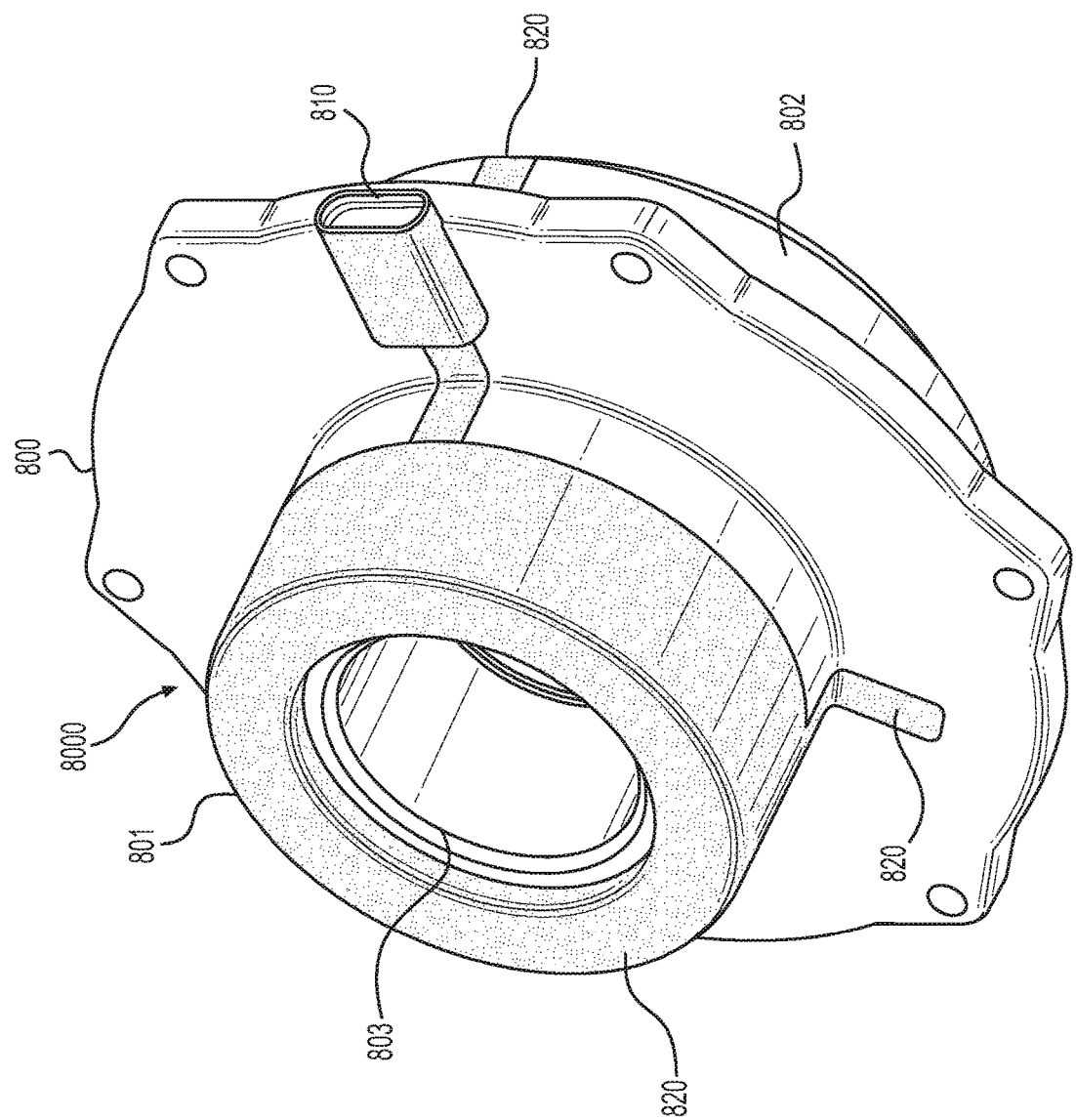
FIG. 8 is a perspective view of an electromagnetic assembly.

In FIG. 4, second input shaft 650 is integrally molded with armature hub 1010, while first input shaft 600 is omitted. FIG. 6 illustrates one example of first input shaft 600, and end spline 601 and bore 603 for pin 630 can be seen. The first input shaft 600 is stepped in response to assembly techniques and the diameters and lengths of the stepped portions are chosen for design purposes, such as bearing or gear sizes, inertia, and stability. For example, the length of bearing surface 605 can be chosen based on whether ball bearings like first bearings 110 are used or other bearings such as needle bearings are used to mount rotatable hub 850 with respect to the first input shaft 600. First bearings 110 comprise balls 111 between races. First bearings 110 permit rotatable hub 850 to rotate around first input shaft 600 during the neutral condition without also rotating the first input shaft 600. First clutch assembly 1100 must be engaged (FIG. 5C) in order for first input shaft 600 to rotate with rotatable hub 850. A spacer 670 can separate and axially restrict first bearings 110 along bearing surface 605. When pin 630 is secured in bore 603, spindle 1210 can axially restrict first bearings 110 in a first axial direction along axis P-P, and an edge of integral spacer 607 can axially restrict first bearings 110 in a second axial direction along axis P-P.

A second portion 608 of the first input shaft 600 is surrounded by the second input shaft 650. So, a second bearing surface 609 can be formed to support one or both second bearings 130. When second input shaft 650 steps down, second portion 608 can also be stepped such that third bearing surface 611 is formed complementary to a step down in second input shaft 650. Third bearing surface 611 can support a second of the second bearings 130 and can also support one of the constant mesh gears of the transmission assembly 105, such as first gear 7080. A fourth bearing surface 613 can be included for supporting a first end plate bearing 140 that permits the first input shaft 600 to rotate relative to and be supported by the end plate 16. First portion 606 of input shaft 600 spans through the dual-clutch assembly 101 and second portion 608 transitions in to the transmission assembly 105. As above, the dual-clutch assembly can be a dry assembly, while the transmission assembly 105 can be a wet assembly, and so seal 15 can couple to first input shaft 600 and does so in the example on second portion 608 at the end of second bearing surface 609.

Second input shaft 650 is rotatable and surrounds the second portion 608 of the rotatable first input shaft 600. Rotatable second input shaft is concentric with the rotatable first input shaft about the axis P-P. Second input shaft 650 can comprise internal and external steps, which facilitates necking-down the transmission assembly 105 for small packaging. Internal steps can be bearing surfaces, such as bearing surface 652, for second bearings 130 so that second input shaft 650 can rotate relative to the first input shaft 600 without rotating the first input shaft 600 and vice versa. Another step can be included in internal surface of second input shaft to accommodate seal 15. External steps can accommodate seal 13 and can comprise a gear surface 651 for mounting second gear 7030. Alternatively, second gear 7030 can be integrally formed with the second input shaft 650 in the location of gear surface 651.

A rotatable hub 850 surrounds the first portion 606 of the rotatable first input shaft 600. A limiter rim 851 can be included on the rotatable hub 850 to limit vibratory motion of the rotatable hub 850 with respect to the spacer 670. First clutch rotor 1101 is connected to the rotatable hub 850 as by press-fitting an inner surface of the first clutch rotor 1101 to an outer surface of the rotatable hub 850. First clutch rotor 1101 can comprise a cup shape so as to provide a surface for pulley coupling 1103, a surface for coupling surface 1105, and a surface for fitting to rotating hub 850. The cup-shape can be configured to surround a portion of electromagnetic mounting hub 800 associated with first coil winding 811.

A second clutch rotor 900 is connected to the rotatable hub 850 as by press-fitting a bore surface 935 of the second clutch rotor 900 to another outer surface of the rotatable hub 850. Second clutch rotor 900 can also comprise a cup shape and also provide for coupling surface 922. The cup-shape can be configured to surround a second portion of electromagnetic hub associated with second coil winding 812. Inner lip surface 933 and outer lip surface 931 surround a portion of second core 802 but do not physically coupled thereto. A like arrangement of inner and outer lips can be included on first clutch rotor 1101 to surround a portion of first core 801.

First clutch rotor 1101 and second clutch rotor 900 are fixed to rotatable hub 850 and these can rotate together when torque is applied to pulley coupling 1103. A bearing 120 is included between electromagnetic mounting hub 800 and rotatable hub 850 so that electromagnetic assembly 8000 can remain stationary while the rotatable hub 850 rotates. Among other bearing types, bearing 120 can comprise needles 121 and constitute a needle bearing.

A control device can be coupled to control plug 810 to supply electric signals to the first and second coil windings 811, 812 and thereby induce electromagnetic signals that can attract one of the first and second armature plates 1221, 1011 for torque coupling through the dual-clutch assembly.

Electromagnetic assembly 8000 can comprise an electromagnetic mounting hub 800. As in FIG. 4, first and second spools 813, 814 can be included for receiving first and second coil windings 811, 812, or electromagnetic assembly 8000 can be spool-less as shown in FIGS. 5A-5C. First core receptacle 805 can receive first coil winding 811 and second core receptacle 806 can receive second coil winding 812. An encapsulation layer 820 can be applied to secure the first and second coil windings 811, 812 in place and to provide shape and requisite insulation. The encapsulation layer can leak in to first and second core receptacles 805, 806 and can be leaked to other areas as needed, such as to channels for wiring or for forming the control plug 810. Inner surface 803 can be spaced from the cup-shaped rotors, but be fitted to the bearing 120. A second inner surface 804 can be formed by stepping the electromagnetic mounting hub 800, which can control electromagnetic signal placement with respect to the other components.

The stationary electromagnetic assembly 8000 comprises electromagnetic mounting hub 800 mounted between the first clutch rotor 1101 and the second clutch rotor 900. The electromagnetic assembly 8000 is configured to emit at least a first electromagnetic signal and a second electromagnetic signal. First armature assembly 1200 is coupled to the first input shaft 600. The first armature assembly 1200 is configured to couple to the first clutch assembly coupling surface 1105 of the first clutch rotor 1101 when the electromagnetic assembly 8000 emits the first electromagnetic signal. A second armature assembly 1000 is coupled to the second input shaft 650. The second armature assembly 1000 is configured to couple to the second clutch coupling surface 922 of the second clutch rotor 900 when the electromagnetic assembly 8000 emits the second electromagnetic signal. Absent the first electromagnetic signal and the second electromagnetic signal, the rotatable hub rotates 850, but neither the rotatable first input shaft 600 nor the rotatable second input shaft 650 rotate.

When the dual-clutch assembly 101 is coupled to the transmission assembly 105, the concentric first input shaft 600 and second input shaft 650 are coupled to gears that are in constant mesh with counter shaft 700. Counter shaft 700 can comprise an integrally formed gear, such as second output gear 703. One or both of the first output gear 708 and the second output gear 703 can be integrally formed with the counter shaft 700 to connect to the counter shaft. Alternatively or additionally, gear surfaces can be included, such as gear surface 705, and a gear such as first output gear 708 can be press-fit to the gear surface 705. Other surfaces can be formed in counter shaft 700 for assembly or other purposes, such that counter shaft 700 can be stepped or ringed. For example, bearing surfaces 701 & 707 can be included so that the counter shaft 700 can be mounted with respect to the housing 10 and with respect to the end plate 16. A countershaft bearing 150 such as a needle bearing and a second end plate bearing 160 such as a ball bearing can be included so that the counter shaft 700 can rotate with the housing 10 and end plate 16 remain stationary. A coupler surface 709 can be included in the countershaft 700 for receiving the coupler 2010 for coupling to an end device, such as a supercharger. Snap rings or bushings can be included where necessary to maintain positions of bearings and gears along the Q-Q axis.

A gear set for a two speed, dual clutch transmission can comprise a rotatable first input shaft 600 and a first gear 7080 comprising a first gear ratio coupled to the first input shaft 600. A rotatable second input shaft 650 can surround a portion 608 of the first input shaft 600. The second input shaft 650 can be concentric with the first input shaft 600 about an axis P-P. A second gear 7030 can comprise a second gear ratio coupled to the second input shaft 650. A counter shaft 700 can be parallel along an axis Q-Q to the first input shaft 600. The counter shaft 700 forms a torque output for the transmission assembly 105. A first output gear 708 can be connected to the counter shaft 700, the first output gear 708 coupled to transfer torque from the first gear 7080. First gear 7080 receives torque from pulley coupling 1103 when the first clutch assembly 1100 is electromagnetically clamped to close first gap G1. Then, first clutch rotor 1101 passes torque to first armature assembly 1200, which passes torque to the first input shaft 600. A second output gear 703 can be connected to the counter shaft 700, the second output gear 703 coupled to transfer torque from the second gear 7030. The second gear 7030 receives torque from pulley coupling 1103 when the second clutch assembly 9000, which is linked via rotatable hub 850 to the first pulley coupling 1103 of first clutch rotor 1101, is electromagnetically clamped to close second gap G2. Then, second clutch rotor 900 passes torque to the second armature assembly 1000, which passes torque to second input shaft 650. First gear 7080 is in constant mesh with the first output gear 708. Second gear 7030 is in constant mesh with the second output gear 703. First gear 7080 and first output gear 708 are configured to rotate the counter shaft 700 at a first drive ratio while second gear 7030 and second output gear 703 are configured to rotate the counter shaft 700 at a second drive ratio.

Other implementations will be apparent to those skilled in the art from consideration of the specification and practice of the examples disclosed herein.

What is claimed is:

1. A dual-clutch assembly, comprising:
   a rotatable first input shaft comprising a first portion and a second portion; a rotatable second input shaft surrounding the first portion of the first
      rotatable input shaft, the second input shaft concentric with the first input shaft;
   a rotatable hub surrounding the second portion of the first input shaft; a first clutch rotor connected to the rotatable hub, the first clutch rotor comprising a pulley coupling and a first clutch coupling surface;
   a second clutch rotor connected to the rotatable hub, the second clutch rotor comprising a second clutch coupling surface;
   a stationary electromagnetic assembly mounted between the first clutch rotor and the second clutch rotor, the electromagnetic assembly configured to emit at least a first electromagnetic signal and a second electromagnetic signal;
   a first armature assembly coupled to the first input shaft, the first armature assembly configured to couple to the first clutch coupling surface of the first clutch rotor when the electromagnetic assembly emits the first electromagnetic signal; and
   a second armature assembly coupled to the second input shaft, the second armature assembly configured to couple to the second clutch coupling surface of the second clutch rotor when the electromagnetic assembly emits the second electromagnetic signal.

2. The dual-clutch assembly of claim 1, further comprising a bearing between the electromagnetic assembly and the rotatable hub, the bearing configured so that the rotatable hub can rotate with the first clutch rotor and with the second clutch rotor while the electromagnetic assembly remains stationary.

3. The dual-clutch assembly of claim 1, wherein, when a pulley couples torque to the pulley coupling surface, and absent the first electromagnetic signal and the second electromagnetic signal, the rotatable hub rotates, but neither the first rotatable input shaft nor the second rotatable input shaft rotate.

4. The dual-clutch assembly of claim 1, wherein, when the electromagnetic assembly emits the first electromagnetic signal, the first armature assembly couples the first input shaft to the first clutch rotor, and the first input shaft is configured to under-run a pulley speed of a pulley connected to the pulley coupling.

5. The dual-clutch assembly of claim 1, wherein, when the electromagnetic assembly emits the second electromagnetic signal, the second armature assembly couples the second input shaft to the second clutch rotor, and the second input shaft is configured to over-run a pulley speed of a pulley connected to the pulley coupling.

6. A dual-clutch transmission comprising:
   a dual-clutch assembly, comprising:
      a rotatable first input shaft comprising a first portion and a second portion; a rotatable second input shaft surrounding the first portion of the first
         rotatable input shaft, the second input shaft concentric with the first input shaft;
      a rotatable hub surrounding the second portion of the first input shaft; a first clutch rotor connected to the rotatable hub, the first clutch rotor comprising a pulley coupling and a first clutch coupling surface;
      a second clutch rotor connected to the rotatable hub, the second clutch rotor comprising a second clutch coupling surface;
      a stationary electromagnetic assembly mounted between the first clutch rotor and the second clutch rotor, the electromagnetic assembly configured to emit at least a first electromagnetic signal and a second electromagnetic signal;
      a first armature assembly coupled to the first input shaft, the first armature assembly configured to couple to the first clutch coupling surface of the first clutch rotor when the electromagnetic assembly emits the first electromagnetic signal; and
      a second armature assembly coupled to the second input shaft, the second armature assembly configured to couple to the second clutch coupling surface of the second clutch rotor when the electromagnetic assembly emits the second electromagnetic signal;
   a first gear coupled to the first input shaft;
   a second gear coupled to the second input shaft;
   a counter shaft forming a torque output;
   a first output gear connected to the counter shaft, the first output gear coupled to transfer torque from the first gear; and
   a second output gear connected to the counter shaft, the second output gear coupled to transfer torque from the second gear.

7. The dual-clutch transmission of claim 6, wherein the first gear is in constant mesh with the first output gear during operation of the clutch transmission, and wherein the second output gear is in constant mesh with the second gear during operation of the clutch transmission.

8. The dual-clutch transmission of claim 6, wherein one or both of the first output gear and the second output gear are integrally formed with the counter shaft to connect to the counter shaft.

9. The dual-clutch transmission of claim 6, wherein the first gear and the first output gear are configured to rotate the counter shaft at a first drive ratio, and wherein the second gear and the second output gear are configured to rotate the counter shaft at a second drive ratio.

10. The dual-clutch transmission of claim 6, further comprising:
   a clutch housing portion surrounding at least the second armature assembly and providing a dry environment for the second armature assembly; and
   a gear housing portion surrounding a portion of the second rotatable input shaft and providing a fluid-tight container for the portion of the second rotatable input shaft.

11. The dual-clutch transmission of claim 6, further comprising a coupler for coupling the counter shaft to a supercharger assembly.

12. A supercharger assembly comprising:
   a dual-clutch assembly, comprising:
      a rotatable first input shaft comprising a first portion and a second portion; a rotatable second input shaft surrounding the first portion of the first rotatable input shaft, the second input shaft concentric with the first input shaft;
      a rotatable hub surrounding the second portion of the first input shaft; a first clutch rotor connected to the rotatable hub, the first clutch rotor comprising a pulley coupling and a first clutch coupling surface;
      a second clutch rotor connected to the rotatable hub, the second clutch rotor comprising a second clutch coupling surface;
      a stationary electromagnetic assembly mounted between the first clutch rotor and the second clutch rotor, the electromagnetic assembly configured to emit at least a first electromagnetic signal and a second electromagnetic signal;
      a first armature assembly coupled to the first input shaft, the first armature assembly configured to couple to the first clutch coupling surface of the first clutch rotor when the electromagnetic assembly emits the first electromagnetic signal; and
      a second armature assembly coupled to the second input shaft, the second armature assembly configured to couple to the second clutch coupling surface of the second clutch rotor when the electromagnetic assembly emits the second electromagnetic signal;
   a supercharger input shaft mechanically coupled to the clutch transmission, the supercharger assembly configured to selectively convert between a neutral operation mode, a first drive ratio operation mode, and a second drive ratio operation mode in response to the presence or absence of the first electromagnetic signal and the second electromagnetic signal.

13. The supercharger assembly of claim 12, comprising a pair of lobed rotors, wherein the pair of lobed rotors are mechanically coupled to the supercharger input shaft, and wherein the neutral operation mode does not transfer torque from the clutch transmission to the pair of lobed rotors.

14. The supercharger assembly of claim 12, further comprising a transmission assembly, comprising:
   a rotatable first input shaft;
   a first gear comprising a first gear ratio coupled to the first input shaft;
   a rotatable second input shaft surrounding a portion of the first input shaft, the second input shaft concentric with the first input shaft;
   a second gear comprising a second gear ratio coupled to the second input shaft;
   a counter shaft parallel to the first input shaft;
   a first output gear connected to the counter shaft, the first output gear coupled to transfer torque from the first gear; and
   a second output gear connected to the counter shaft, the second output gear coupled to transfer torque from the second gear,
   wherein the first gear is in constant mesh with the first output gear, and wherein the second output gear is in constant mesh with the second gear.

15. The supercharger assembly of claim 14, wherein the first gear and the first output gear are configured to rotate the counter shaft at a first drive ratio, and wherein the second gear and the second output gear are configured to rotate the counter shaft at a second drive ratio.

* * * * *